United States Patent
Shimoda

(10) Patent No.: US 8,643,915 B2
(45) Date of Patent: Feb. 4, 2014

(54) IMAGE SENSOR UNIT, AND IMAGE READING APPARATUS AND IMAGE FORMING APPARATUS USING THE SAME

(75) Inventor: Shuuichi Shimoda, Saitama (JP)

(73) Assignee: Canon Components, Inc. (JP)

( * ) Notice: Subject to any disclaimer, the term of this patent is extended or adjusted under 35 U.S.C. 154(b) by 77 days.

(21) Appl. No.: 13/467,357

(22) Filed: May 9, 2012

(65) Prior Publication Data

US 2012/0287484 A1   Nov. 15, 2012

(30) Foreign Application Priority Data

May 11, 2011  (JP) .................................. 2011-106432
Apr. 6, 2012   (JP) .................................. 2012-087401

(51) Int. Cl.
*H04N 1/04* (2006.01)

(52) U.S. Cl.
USPC ............ 358/475; 358/474; 358/509; 358/497

(58) Field of Classification Search
USPC .......... 358/474, 475, 509, 497, 513, 514, 496
See application file for complete search history.

(56) References Cited

U.S. PATENT DOCUMENTS

| | | | |
|---|---|---|---|
| 5,119,232 A | 6/1992 | Daley et al. | |
| 5,166,832 A * | 11/1992 | Zychowicz | 359/841 |
| 5,673,122 A | 9/1997 | Omori | |
| 6,166,832 A * | 12/2000 | Fujimoto | 358/484 |
| 6,724,503 B1 * | 4/2004 | Sako et al. | 358/483 |
| 7,042,598 B2 | 5/2006 | Payne | |
| 7,190,493 B2 * | 3/2007 | Maki et al. | 358/461 |
| 7,284,891 B2 | 10/2007 | Saito et al. | |
| 7,538,911 B2 * | 5/2009 | Sakurai et al. | 358/475 |
| 8,228,567 B2 * | 7/2012 | Kim | 358/475 |
| 8,310,737 B2 * | 11/2012 | Nagao et al. | 358/475 |
| 2002/0114152 A1 | 8/2002 | Fujino et al. | |
| 2005/0195618 A1 | 9/2005 | Uemura et al. | |
| 2006/0152942 A1 | 7/2006 | Saito et al. | |
| 2009/0027743 A1 | 1/2009 | Han | |

(Continued)

FOREIGN PATENT DOCUMENTS

| EP | 0252709 A2 | 1/1988 |
|---|---|---|
| EP | 0557891 A1 | 9/1993 |

(Continued)

OTHER PUBLICATIONS

Extended European Search Report for EP 11194502.8, mail date Dec. 4, 2012. Cited related co-pending U.S. Appl. No. 13/328,553.

(Continued)

*Primary Examiner* — Negussie Worku
(74) *Attorney, Agent, or Firm* — Rossi, Kimms & McDowell LLP

(57) ABSTRACT

An image sensor unit includes: a light guide reflecting light rays entering through a first light entering surface and a second light entering surface provided at both ends thereof, by a reflection surface to make the light rays exit through a light exiting surface and illuminates an original; a first light source provided near the first light entering surface; a second light source provided near the second light entering surface and different in wavelength from the first light source; and a first reflection part and a second reflection part provided on the reflection surface and composed of dot patterns constituted of two kinds of dots different in spectral reflectance.

7 Claims, 9 Drawing Sheets

(56) References Cited

U.S. PATENT DOCUMENTS

| | | |
|---|---|---|
| 2009/0218525 A1 | 9/2009 | Ikeda et al. |
| 2009/0294630 A1 | 12/2009 | Saito et al. |
| 2010/0046045 A1 | 2/2010 | Nagao et al. |
| 2012/0154876 A1 | 6/2012 | Shimoda |
| 2012/0154877 A1 | 6/2012 | Kisara et al. |
| 2012/0162727 A1* | 6/2012 | Shimoda et al. ............. 358/475 |
| 2013/0009037 A1 | 1/2013 | Takahashi |
| 2013/0038912 A1 | 2/2013 | Horiguchi et al. |
| 2013/0038914 A1* | 2/2013 | Yoshida et al. ............... 358/474 |

FOREIGN PATENT DOCUMENTS

| | | |
|---|---|---|
| EP | 1049055 A2 | 11/2000 |
| EP | 1835469 A2 | 9/2007 |
| EP | 2134071 A2 | 12/2009 |
| FR | 2655799 A1 | 6/1991 |
| JP | 04-150454 A | 5/1992 |
| JP | 09-214675 A | 8/1997 |
| JP | 10-285330 A | 10/1998 |
| JP | 2000324308 A | 11/2000 |
| JP | 2001-005122 A | 1/2001 |
| JP | 2001-272677 A | 10/2001 |
| JP | 2003-281913 A | 10/2003 |
| JP | 2004-146870 A | 5/2004 |
| JP | 2005198106 A | 7/2005 |
| JP | 2005-223424 A | 8/2005 |
| JP | 2006-311232 A | 11/2006 |
| JP | 3885088 B2 | 11/2006 |
| JP | 2007-194797 A | 8/2007 |
| JP | 2007-300536 A | 11/2007 |
| JP | 2008-42425 A | 2/2008 |
| JP | 2009-086488 A | 4/2009 |
| JP | 2011-124741 | 6/2011 |
| WO | 2006/137263 A1 | 12/2006 |

OTHER PUBLICATIONS

Japanese Office Action for JP 2011-236415, mail date Nov. 13, 2012. Cited related co-pending U.S. Appl. No. 13/328,553.
Japanese Office Action for JP 2010-282128, dated Nov. 6, 2012.Cited related co-pending U.S. Appl. No. 13/328,553.
International Search Report for PCT/JP2010/069500, mail date Nov. 30, 2010. Cited in related co-pending U.S. Appl. No. 13/328,553.
Japanese Office Action for JP 2012-247653, mail date Dec. 11, 2012. Cited in related co-pending U.S. Appl. No. 13/328,553.
Extended European Search Report for corresponding EP 12179608.0, mail date Nov. 21, 2012. Cited in Related co-pending U.S. Appl. No. 13/570,645.
Office Action issued in related Japanese Patent Application No. 2012-087401 dated Apr. 30, 2013.
European Office Action issued in Corresponding European Patent Application No. 12167240.6 dated May 17, 2013.
KR OA issued Jun. 27, 2013 for corres. KR 10-2012-49430.

* cited by examiner

IMAGE SENSOR UNIT, AND IMAGE READING APPARATUS AND IMAGE FORMING APPARATUS USING THE SAME

CROSS-REFERENCE TO RELATED APPLICATIONS

This application is based upon and claims the benefit of priority of the prior Japanese Patent Application No. 2011-106432, filed on May 11, 2011, and the Japanese Patent Application No. 2012-087401, filed on Apr. 6, 2012, the entire contents of which are incorporated herein by reference.

BACKGROUND OF THE INVENTION

1. Field of the Invention

The present invention relates to an image sensor unit, and an image reading apparatus and an image forming apparatus using the image sensor unit. The present invention particularly relates to an image sensor unit enabling light rays from a plurality of light sources to exit from a light guide, and an image reading apparatus and an image forming apparatus using the image sensor unit.

2. Description of the Related Art

Recently, there is a need to enhance the color reproducibility of an umber U-base color being an intermediate color between red R and green G in the result of reading by an image sensor unit used for an image reading apparatus and an image forming apparatus. In such a case, the color reproducibility of the intermediate color can be enhanced by adding a light emitting element emitting a light ray with an emission wavelength corresponding to the intermediate color whose color reproducibility is desired to be enhanced.

Further, there is an original to be read by the image sensor unit which is printed with invisible ink for the purpose of security, and there is a need to also read an ultraviolet wavelength region and a near-infrared wavelength region which are wavelength regions outside the visible region. In such a case, the original printed with the invisible ink can be read by adding light emitting elements emitting light rays with emission wavelengths in the ultraviolet wavelength region and the near-infrared wavelength region as in the above-described method of enhancing the color reproducibility of the intermediate color.

However, when the light emitting elements emitting the light rays with desired emission wavelengths are increased in number, the area of the light entering surface of the light guide needs to be increased for allowing the light rays from all of the light emitting elements to enter through the light entering surface of the light guide. The increase in the area of the light entering surface inevitably leads to an increase in size of the cross-sectional shape of the light guide, bringing about a problem in which the formation of the light guide becomes difficult as well as the light guide and the image sensor unit themselves increase in size.

Thus, a method of providing LEDs at both ends of the light guide so as to increase the total light amount is disclosed in Patent Document 1.

Patent Document 1: Japanese Laid-open Patent Publication No. 9-214675

SUMMARY OF THE INVENTION

Here, an example of the arrangement of a light source 100 and a light guide 110 will be described referring to FIG. 12A. FIG. 12A is a perspective view illustrating the arrangement of the light source 100 and the light guide 110. The light source 100 is for illuminating an original. The light source 100 is composed of, for example, light emitting elements 100r, 100g, 100b emitting light rays with emission wavelengths of red R, green G, blue B. The light guide 110 is formed of a transparent member having a length corresponding to the width of the original that is an object to be illuminated. The light guide 110 has one end surface being a light entering surface 110a allowing the light rays from the light emitting elements 100r, 100g, 100b to enter. In other words, the light emitting elements 100r, 100g, 100b are arranged at positions facing the light entering surface 110a. Further, one surface in the longitudinal direction of the light guide 110 (a lower surface of the light guide 110) is a main reflection surface 110b reflecting the light ray entering through the light entering surface 110a inside the light guide 110. Further, the surface opposite to the reflection surface 110b is a light exiting surface 110c through which the light ray reflected from the reflection surface 110b exits.

The light ray exiting through the light exiting surface 110c illuminates the original. The reflection surface 110b is formed with a reflection part 120 so that the light ray exiting through the light exiting surface 110c exits at this time uniformly in the longitudinal direction of the light guide 110. In more particular, as illustrated in FIG. 12A, a dot pattern (light diffusion pattern) made by applying dots 120a which have a distribution density increasing from the light entering surface 110a side toward the opposing surface 110d side opposite thereto, is formed as the reflection part 120. This dot pattern is formed by applying a white paint in dots.

FIG. 12B is a graph indicating the position in the longitudinal direction of the reflection surface 110b on the horizontal axis and the distribution density of the dots 120a formed on the reflection surface 110b on the vertical axis. As illustrated in FIG. 12B, the distribution density of the dots 120a increases toward the opposing surface 110d opposite to the light entering surface 110a. Forming the reflection part 120 composed of such a dot pattern on the reflection surface 110b enables light rays to exit uniformly in the longitudinal direction of the light guide 110 by the reflection surface 110b irrespective of the distance from the light emitting elements 110r, 110g, 110b.

If the light emitting elements emitting light rays with the desired wavelengths are increased in number here, the area of the light entering surface 110a needs to be increased in order to make the light rays from all of the light emitting elements enter through the light entering surface 110a.

Hence, it is conceivable to arrange the light emitting elements with the above-described desired emission wavelengths on a surface, as a light entering surface 110e, opposite to the light entering surface 110a where the light emitting elements 100r, 100g, 100b are arranged as in the light guide 110 illustrated in FIG. 13A. In FIG. 13A, a light emitting element 100u of umber U, a light emitting element 100ir of near-infrared IR and a light emitting element 100uv of ultraviolet UV are arranged in a manner to face the light entering surface 110e.

However, in the configuration illustrated in FIG. 13A, the reflection part 120 composed of the dot pattern in which the distribution density of the dots 120a increases from the light entering surface 110a side toward the light entering surface 110e side is formed on the reflection surface 110b of the light guide 110. Therefore, the light rays from the light emitting elements 100r, 100g, 100b entering through the light entering surface 110a uniformly exit through the light exiting surface 110c by the reflection part 120 as illustrated in FIG. 13B.

On the other hand, the light rays from the added light emitting elements 100u, 100ir, 100uv entering through the light entering surface 110e are large in amount in exiting on the light entering surface 110e side where the distribution density of the dots 120a is high, and are small in amount in exiting on the light entering surface 110a side where the distribution density of the dots 120a is low.

This causes a problem in which the illuminance of light rays exiting from the light guide 110 becomes non-uniform.

The present invention has been made in consideration of the above-described problems and an object thereof is to provide an image sensor unit which makes it possible to increase the number of light emitting elements emitting light rays with desired emission wavelengths without increasing the size of a light guide and to make uniform the illuminance of light rays exiting from the light guide toward an illuminated object, and an image reading apparatus and an image forming apparatus using the image sensor unit.

The image sensor unit of the present invention is an image sensor unit including: a light guide reflecting light rays from a first light source and a second light source arranged near light entering surfaces at both ends thereof, by a reflection surface to make the light rays exit through a light exiting surface and illuminates an illuminated object; an imaging element forming an image of a reflection light ray from the illuminated object; and a sensor substrate on which a plurality of photoelectric conversion elements receiving the reflection light ray whose image is formed by the imaging element is mounted, wherein the first light source is composed of one or a plurality of light emitting elements, wherein the second light source is a light source different in emission wavelength from the first light source and composed of one or a plurality of light emitting elements, wherein the reflection surface provided at a surface opposing the light exiting surface is provided with a first reflection part and a second reflection part, wherein the first reflection part has a high spectral reflectance with respect to an emission wavelength from the light emitting element provided in the first light source, and has a reflectance on a side of the light entering surface arranged opposite to the first light source higher than a reflectance on a side of the light entering surface near which the first light source is arranged, and wherein the second reflection part has a high spectral reflectance with respect to an emission wavelength from the light emitting element provided in the second light source, and has a reflectance on a side of the light entering surface arranged opposite to the second light source higher than a reflectance on a side of the light entering surface near which the second light source is arranged.

The image reading apparatus of the present invention is an image reading apparatus including: an image sensor unit; and an image reading section for reading a reflection light ray from an illuminated object while relatively moving the image sensor unit and the illuminated object, wherein the image sensor unit includes: a light guide reflecting light rays from a first light source and a second light source arranged near light entering surfaces at both ends thereof, by a reflection surface to make the light rays exit through a light exiting surface and illuminates the illuminated object; an imaging element forming an image of a reflection light ray from the illuminated object; and a sensor substrate on which a plurality of photoelectric conversion elements receiving the reflection light ray whose image is formed by the imaging element is mounted, wherein the first light source is composed of one or a plurality of light emitting elements, wherein the second light source is a light source different in emission wavelength from the first light source and composed of one or a plurality of light emitting elements, wherein the reflection surface provided at a surface opposing the light exiting surface is provided with a first reflection part and a second reflection part, wherein the first reflection part has a high spectral reflectance with respect to an emission wavelength from the light emitting element provided in the first light source, and has a reflectance on a side of the light entering surface arranged opposite to the first light source higher than a reflectance on a side of the light entering surface near which the first light source is arranged, and wherein the second reflection part has a high spectral reflectance with respect to an emission wavelength from the light emitting element provided in the second light source, and has a reflectance on a side of the light entering surface arranged opposite to the second light source higher than a reflectance on a side of the light entering surface near which the second light source is arranged.

The image forming apparatus of the present invention is an image forming apparatus including: an image sensor unit; an image reading section for reading a reflection light ray from an illuminated object while relatively moving the image sensor unit and the illuminated object; and an image forming section for forming an image on a recording medium, wherein the image sensor unit includes: a light guide reflecting light rays from a first light source and a second light source arranged near light entering surfaces at both ends thereof, by a reflection surface to make the light rays exit through a light exiting surface and illuminates the illuminated object; an imaging element forming an image of a reflection light ray from the illuminated object; and a sensor substrate on which a plurality of photoelectric conversion elements receiving the reflection light ray whose image is formed by the imaging element is mounted, wherein the first light source is composed of one or a plurality of light emitting elements, wherein the second light source is a light source different in emission wavelength from the first light source and composed of one or a plurality of light emitting elements, wherein the reflection surface provided at a surface opposing the light exiting surface is provided with a first reflection part and a second reflection part, wherein the first reflection part has a high spectral reflectance with respect to an emission wavelength from the light emitting element provided in the first light source, and has a reflectance on a side of the light entering surface arranged opposite to the first light source higher than a reflectance on a side of the light entering surface near which the first light source is arranged, and wherein the second reflection part has a high spectral reflectance with respect to an emission wavelength from the light emitting element provided in the second light source, and has a reflectance on a side of the light entering surface arranged opposite to the second light source higher than a reflectance on a side of the light entering surface near which the second light source is arranged.

DETAILED DESCRIPTION OF THE PREFERRED EMBODIMENTS

Figure 1:
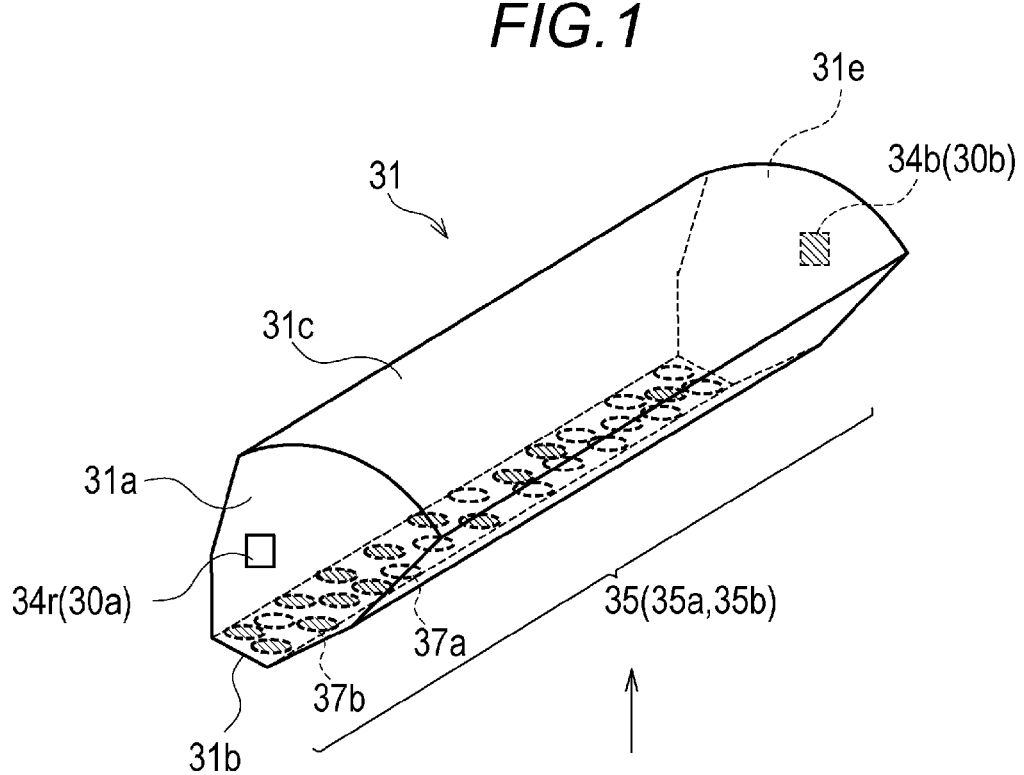
FIG. 1 is a perspective view illustrating the configuration of a light guide 31 of this embodiment.

Hereinafter, an embodiment of the present invention will be described in detail referring to the drawings.

Figure 9:
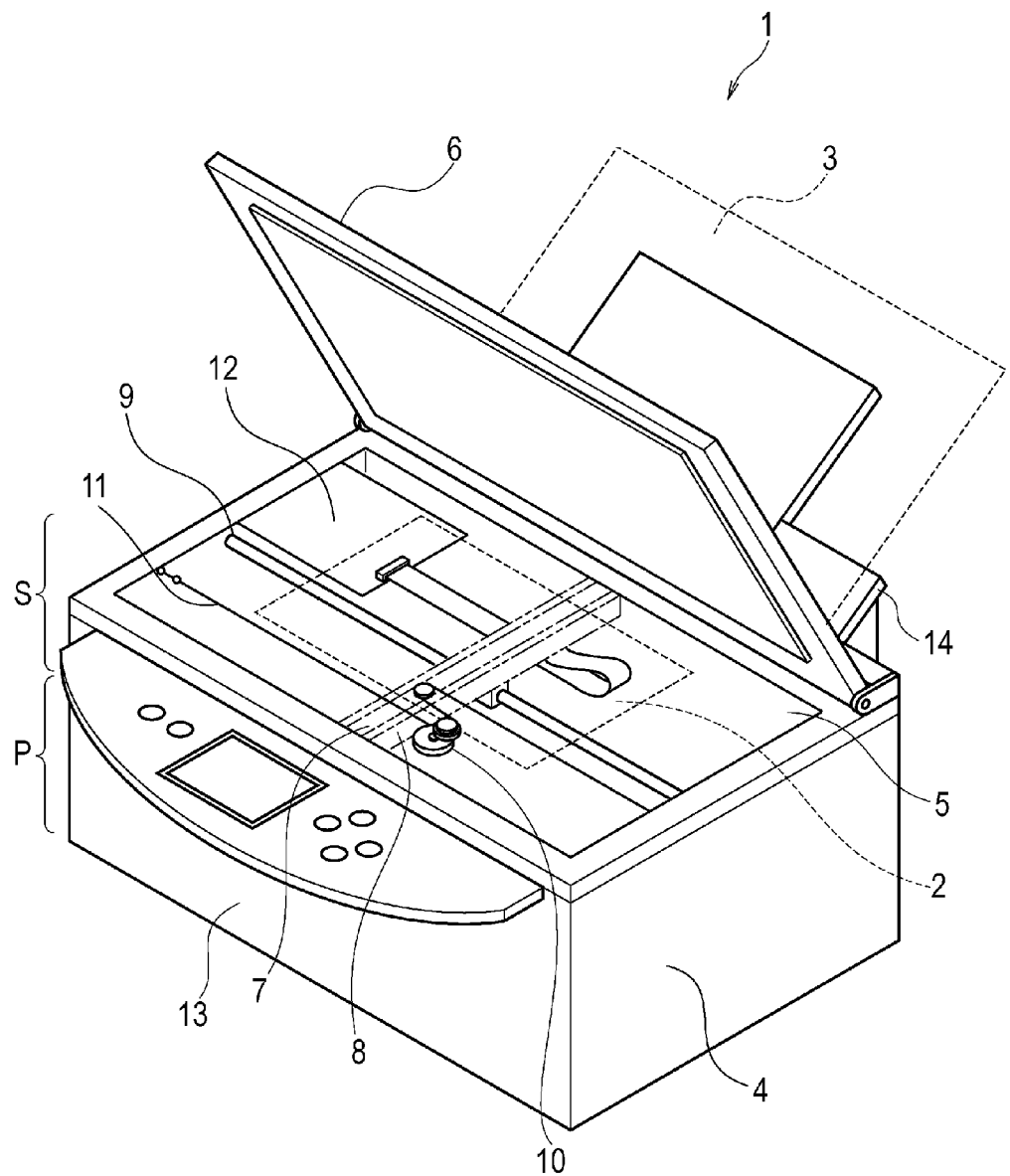
FIG. 9 is a perspective view illustrating an appearance of an MFP 1 of this embodiment.

FIG. 9 is a perspective view illustrating an appearance of a so-called multifunctional printer (MFP) to which the present invention is applicable.

As illustrated in FIG. 9, a numeral 1 denotes the MFP which includes an image reading section S as an image reading means for reading a reflection light ray from an original 2 as an illuminated object, and an image forming section P as an image forming means for forming (printing) the image of the original 2 on a sheet 3 (recording paper) as a recording medium.

The image reading section S has a function of a so-called image scanner and is configured, for example, as follows.

The image reading section S includes a casing 4, a platen glass 5 composed of a transparent plate made of glass as an original placing unit, and a platen cover 6 provided to freely open and close with respect to the casing 4 to be able to cover the original 2.

Further, an image sensor unit 7 is housed inside the casing 4. The image sensor unit 7 is, for example, a contact image sensor (CIS) unit.

A numeral 8 denotes a holding member which holds the image sensor unit 7 in a manner to surround the image sensor unit 7. A numeral 9 denotes an image sensor unit slide shaft provided to be able to move the holding member 8 along the platen glass 5. A numeral 10 denotes an image sensor unit drive motor. A numeral 11 denotes a wire attached to the holding member 8. A numeral 12 denotes a signal processing unit. A numeral 13 denotes a collection unit provided to freely open and close for collecting a printed sheet 3. A numeral 14 denotes a paper feed tray housing the sheet 3 in a predetermined size.

With this configuration, the image sensor unit drive motor 10 mechanically moves the wire 11 to move the image sensor unit 7 in a reading direction (sub-scan direction) along the image sensor unit slide shaft 9. The image sensor unit 7 moved in the reading direction optically reads the original 2 placed on the platen glass 5 and converts it into an image signal (electric signal).

Figure 10:
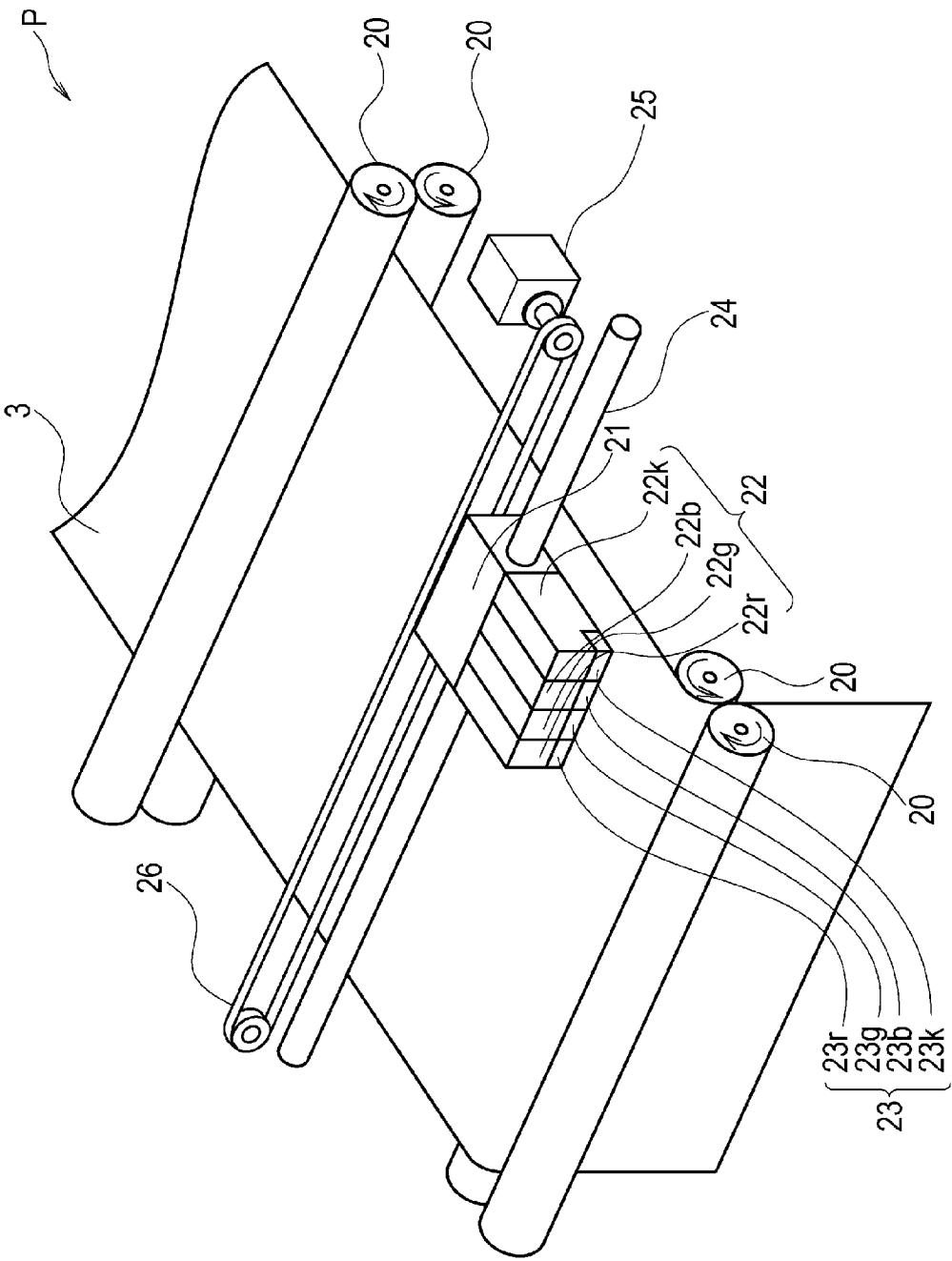
FIG. 10 is a schematic view illustrating the structure of an image forming section P.

FIG. 10 is a schematic view illustrating the structure of the image forming section P.

The image forming section P has a function of a so-called printer and is configured, for example, as follows.

The image forming section P is housed in the casing 4 and includes conveyor rolls 20 and a recording head 21 as illustrated in FIG. 10.

The numeral 21 denotes the recording head which is composed of ink tanks 22*r*, 22*g*, 22*b*, 22*k* storing ink of cyan C, magenta M, yellow Y, black K and discharge heads 23*r*, 23*g*, 23*b*, 23*k* provided at the ink tanks 22 respectively.

A numeral 24 is a recording head slide shaft. A numeral 25 is a recording head drive motor. A numeral 26 is a belt attached to the recording head 21.

With this configuration, the sheet 3 fed from the paper feed tray 14 is conveyed by the conveyor rolls 20 to a recording position.

The recording head 21 performs printing on the sheet 3 based on an image signal while moving in a printing direction (main-scan direction) along the recording head slide shaft 24 by mechanically moving the belt 26 using the recording head drive motor 25.

After repeating the above-described operation until the end of printing, the printed sheet 3 is ejected by the conveyer rolls 20 to the collection unit 13.

Note that though the image forming apparatus by the inkjet method has been described as the image forming section P, any method such as an electrophotographic method, a thermal transfer method, a dot impact method may be employable.

Figure 11:
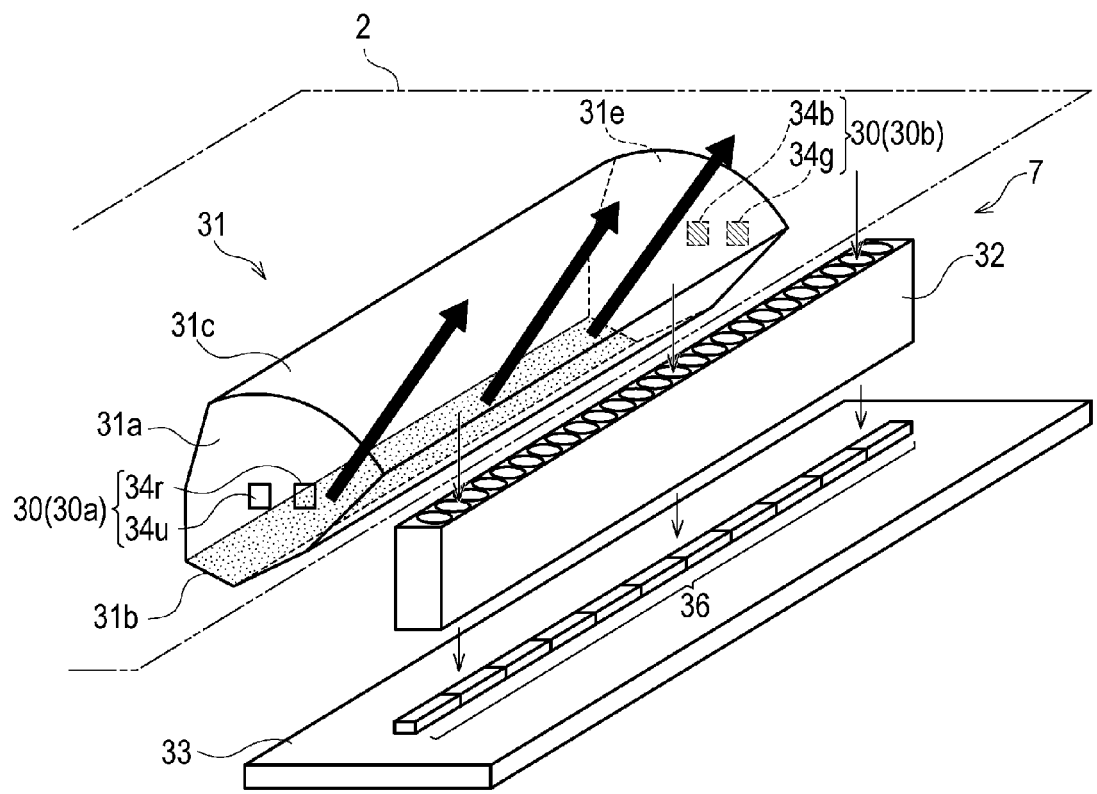
FIG. 11 is a schematic view illustrating the configuration inside an image sensor unit 7 of this embodiment.
Figure 12A:
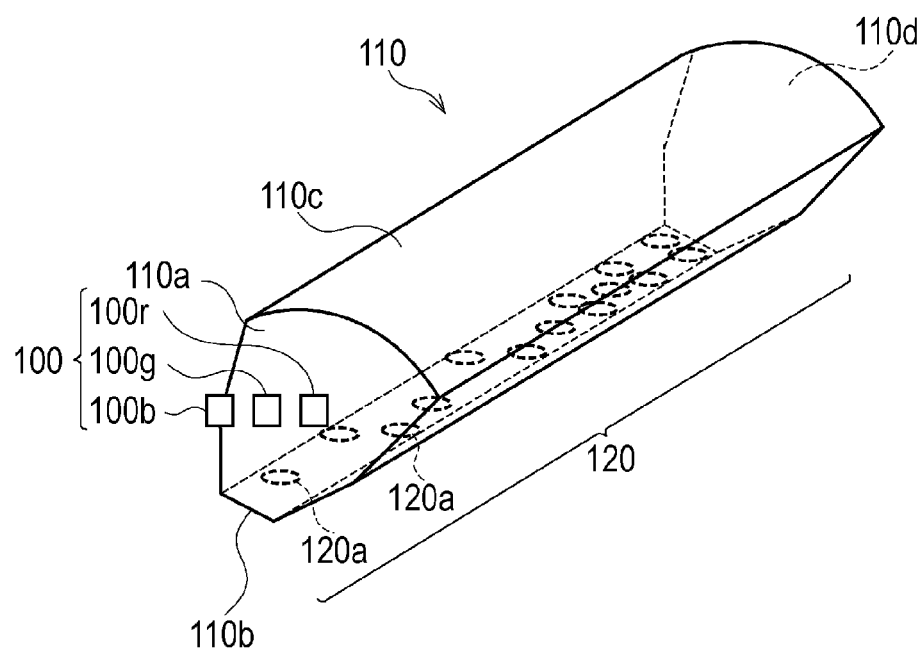
FIG. 12A is a perspective view illustrating an example of a light source 100 and a light guide 110.
Figure 12B:
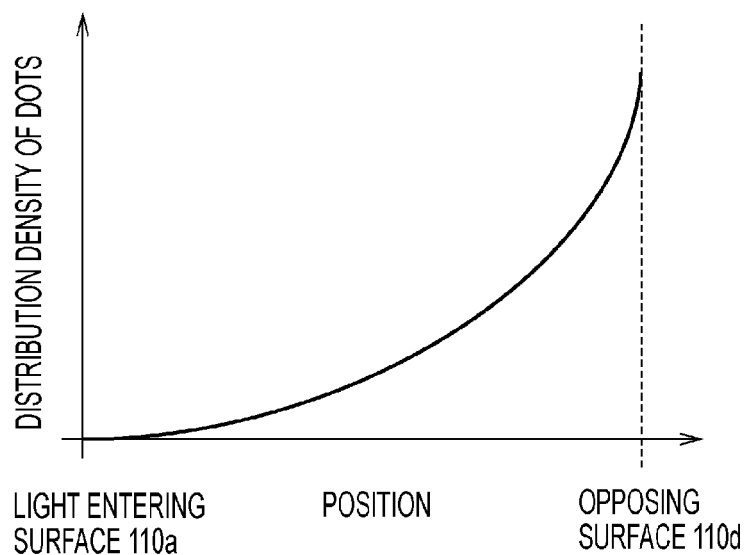
FIG. 12B is a graph indicating the distribution density of dots 120*a*.
Figure 13A:
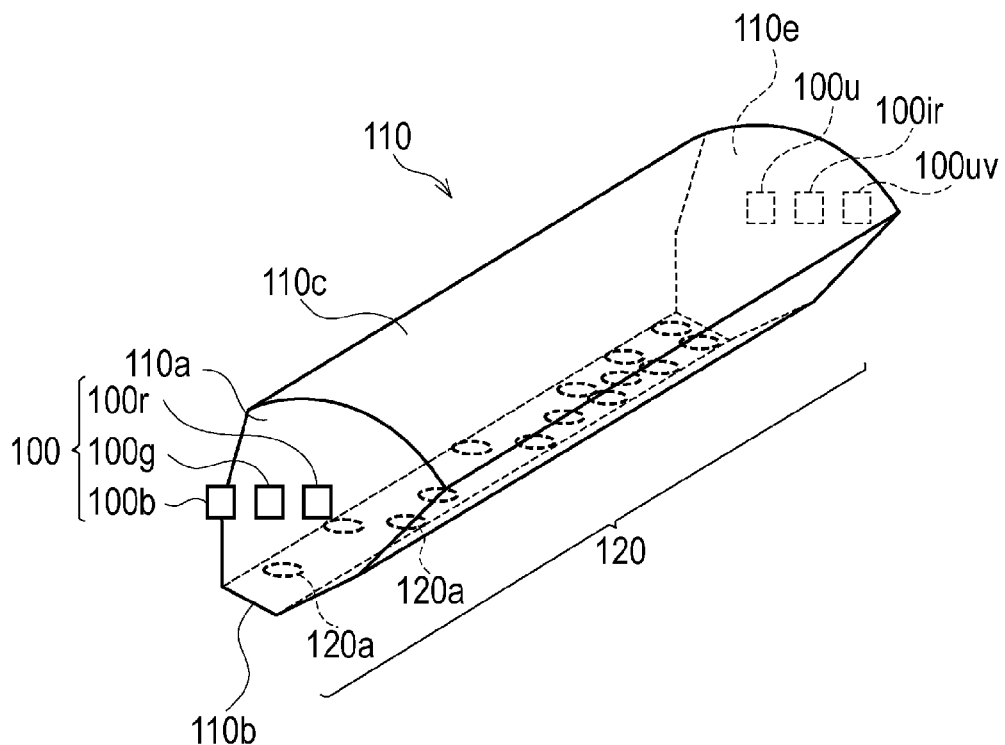
FIG. 13A is a view of the light guide 110 when both ends thereof are light entering surfaces 110*a*, 110*e*.
Figure 13B:
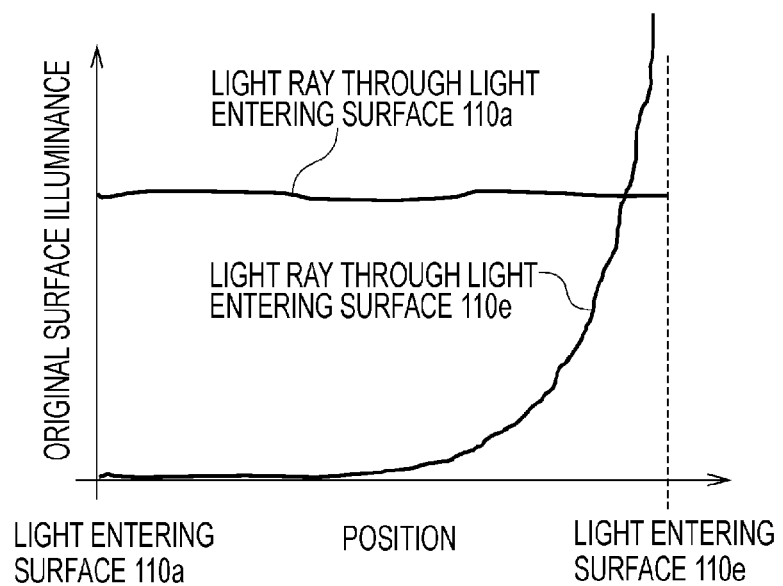
FIG. 13B is a graph indicating the illuminance on the original surface when the original is illuminated by the light guide 110 illustrated in FIG. 13A.

Next, the relation between the components in the image sensor unit 7 and the optical path from a light source 30 will be described referring to FIG. 11. FIG. 11 is a schematic view illustrating the configuration inside the image sensor unit 7. Inside the image sensor unit 7, the light source 30, a light guide 31, a rod lens array 32, and a sensor substrate 33 are arranged.

The light source 30 is for illuminating the original 2, and has light emitting elements 34*r*, 34*g*, 34*b* emitting, for example, light rays with emission wavelengths of red R, green G, blue B, and a light emitting element 34*u* emitting, for example, a light ray with an emission wavelength of umber U. More specifically, the light emitting element 34*u* emitting the light ray with the emission wavelength of umber U is added to increase the color reproducibility of an umber-base color in the image sensor unit 7 of this embodiment. The light emitting elements 34*r*, 34*g*, 34*b*, 34*u* are arranged separately at both ends of the light guide 31. In particular, the light emitting elements 34*r*, 34*u* are arranged as a first light source 30*a* near the end portion on one side of the light guide 31, and the light emitting elements 34*b*, 34*g* are arranged as a second light source 30*b* near the end portion on the other side of the light guide 31. The light source 30 radiates light rays by driving the light emitting elements 34*r*, 34*g*, 34*b*, 34*u* to sequentially turn on.

The light guide 31 is for guiding the light rays radiated from the first light source 30*a* and the second light source 30*b* to the original 2 placed on the above-described platen glass 5, and is formed in an elongated shape having a length corresponding to the width of the original 2. The light guide 31 is formed of a transparent synthetic resin material such as, for example, acrylic resin or polycarbonate.

In this embodiment, an end surface at one of both ends in the longitudinal direction (main-scan direction) of the light guide 31 is formed as a first light entering surface 31*a* which the light rays from the first light source 30*a* enter, and the other end surface opposite thereto is formed as a second light entering surface 31*e* which the light rays from the second light source 30*b* enter. The above-described light emitting elements 34*r*, 34*u* are arranged to face the first light entering surface 31a and separate from the first light entering surface 31a at a predetermined distance. Further, the above-described light emitting elements 34g, 34b are arranged to face the second light entering surface 31e and separate from the second light entering surface 31e at a predetermined distance. The end surfaces of the light guide 31 are formed as the first light entering surface 31a and the second light entering surface 31e, thereby eliminating the necessity of increasing the area of the end surfaces of the light guide 31 even if the light emitting element 34u is added.

Further, the surface of the light guide 31 along the longitudinal direction and opposing the original 2 on the platen glass 5 is a light exiting surface 31c from which the light ray entering the light guide 31 exits. Further, the surface of the light guide 31 opposing the light exiting surface 31c is a reflection surface 31b reflecting, inside the light guide 31, the light rays through the first light entering surface 31a and the second light entering surface 31e.

The reflection surface 31b is provided with a first reflection part 35a and a second reflection part 35b as a reflection part 35.

Thus, the light guide 31 is formed to be able to uniformly reflect and diffuse the light rays from the light emitting elements 34r, 34u entering through the first light entering surface 31a by the first reflection part 35a and the light rays from the light emitting elements 34g, 34b entering through the second light entering surface 31e by the second reflection part 35b. The configuration of uniformly reflecting and diffusing the light rays from the light emitting elements 34r, 34g, 34b, 34u by the reflection surface 31b will be described later.

Further, the other surfaces function as reflection surfaces.

The light guide 31 propagates the light rays entering through the first light entering surface 31a and the second light entering surface 31e through the light guide 31 while totally reflecting the light rays by the reflection surface 31b and the other surfaces in the light guide 31. At the same time, the light rays are diffused and reflected by the first reflection part 35a and the second reflection part 35b provided on the reflection surface 31b and exit through the light exiting surface 31c to illuminate the original 2. The light source 30 and the light guide 31 function as an illumination device illuminating the original 2 as described above.

The rod lens array 32 as an imaging element is made by arranging a plurality of rod lenses of an erect equal magnification image forming type in the same direction as the longitudinal direction of the light guide 31. The rod lens array 32 forms an image of the reflection light ray from the original 2 on a plurality of photoelectric conversion elements 36. The plurality of photoelectric conversion elements 36 is made by arranging a plurality of photoelectric conversion elements. Note that the imaging element is not limited to the rod lens array 32 and may be a micro lens array, for example.

The sensor substrate 33 is made by mounting the plurality of photoelectric conversion elements 36 each converting the reflection light ray whose image is formed by the rod lens array 32 into an image signal, in the same direction as the longitudinal direction of the light guide 31.

The rod lens array 32 and the plurality of photoelectric conversion elements 36 are formed in a length corresponding to the width of the original 2.

When the MFP 1 having the image sensor unit 7 configured as described above reads the original 2, the image sensor unit 7 is moved to a reading start position of the original 2 in the image reading section S. The image sensor unit 7 moved to the reading start position sequentially turns on the light emitting elements 34r, 34g, 34b, 34u of the first light source 30a and the second light source 30b. The light rays from the first light source 30a and the second light source 30b enter through the first light entering surface 31a and the second light entering surface 31e of the light guide 31 respectively, and then uniformly exit through the light exiting surface 31c. The light rays exiting from the light guide 31 are applied in a line shape to the surface of the original 2 over the main-scan direction. The applied light rays are reflected by the original 2 and then image-formed by the rod lens array 32 on the plurality of photoelectric conversion elements 36 mounted on the sensor substrate 33. The plurality of photoelectric conversion elements 36 receive the imaged reflection light rays and convert them into image signals. The image sensor unit 7 converts the reflection light rays of all of the red R, green G, blue B, umber U and ends the reading operation of one scan line along the main-scan direction.

Subsequently, the image sensor unit 7 is moved in the sub-scan direction by one scan line. The image sensor unit 7 performs the reading operation for one scan line as in the foregoing.

The image sensor unit 7 repeats the movement by one scan line and the reading operation for one line as described above and thereby can read the whole original 2.

The image signals converted by the image sensor unit 7 are subjected to image processing as necessary in the signal processing unit 12 and then stored as image data, with which the reading of the whole original 2 placed on the platen glass 5 is completed.

Figure 2:
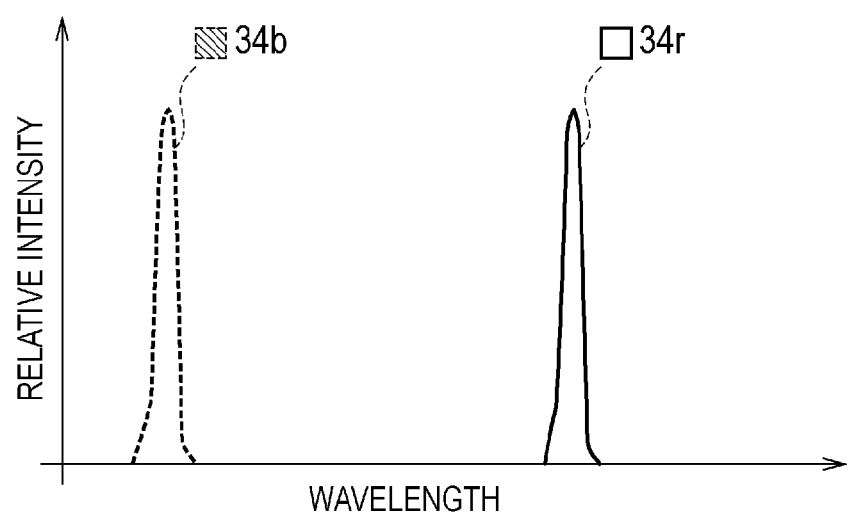
FIG. 2 is a graph indicating the relative relation between the wavelengths of a light emitting element 34b and a light emitting element 34r.

Next, the configuration of uniformly reflecting the light ray from each of the light emitting elements 34r, 34g, 34b, 34u will be described referring to FIG. 1. FIG. 1 is a perspective view illustrating the configuration of the light guide 31. Here, the light emitting elements 34b, 34r among the light emitting elements 34r, 34g, 34b, 34u forming the light source 30 will be described as representatives for easy description. As illustrated in FIG. 1, the light emitting element 34r is arranged as the first light source 30a near the first light entering surface 31a and the light emitting element 34b is arranged as the second light source 30b near the second light entering surface 31e. The wavelength of the light emitting element 34b is about 435.8 nm and the wavelength of the light emitting element 34r is about 700 nm. FIG. 2 is a graph indicating the relative relation between the wavelengths of the light emitting element 34b and the light emitting element 34r. As illustrated in FIG. 2, the light emitting element 34b has a relatively short wavelength as compared to the light emitting element 34r, and the light emitting element 34r has a relatively long wavelength as compared to the light emitting element 34b.

Further, as illustrated in FIG. 1, the first reflection part 35a and the second reflection part 35b are provided on the reflection surface 31b of the light guide 31, and composed of dot patterns (light diffusion patterns) constituted of two kinds of dots 37a and 37b different in spectral reflectance. In particular, the dots 37a, 37b are formed by applying paints different in reflectance depending on the wavelength to the lower surface (reflection surface 31b) of the light guide 31, for example, by silk-screen printing. Note that a region where the dots 37a, 37b are not formed remains as the material of the light guide 31 (transparent).

Figure 3:
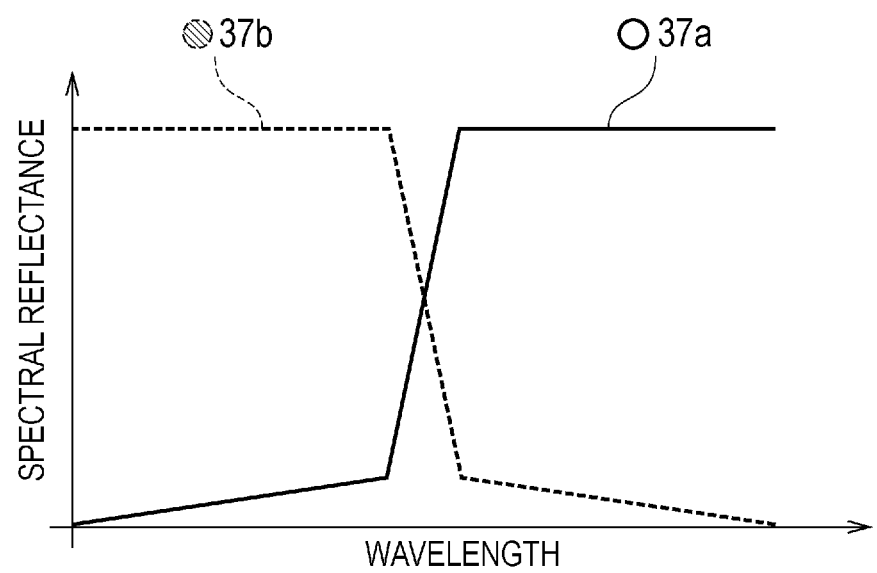
FIG. 3 is a graph indicating the characteristics of the spectral reflectances of dots 37a, 37b of this embodiment.

FIG. 3 is a graph indicating the characteristics of the spectral reflectances of the dots 37a, 37b. As illustrated in FIG. 3, the dot 37a has a characteristic that its reflectance to a light ray with a long wavelength is high as compared to the dot 37b. On the other hand, the dot 37b has a characteristic that its reflectance to a light ray with a short wavelength is high as compared to the dot 37a. In other words, the dot 37a has a high reflectance to the light ray emitted from the light emitting element 34r and a low reflectance to the light ray emitted from the light emitting element 34b. On the other hand, the dot 37b has a high reflectance to the light ray emitted from the light emitting element 34b and a low reflectance to the light ray emitted from the light emitting element 34r. Concretely, the dot patterns are formed by printing the dots 37a with a paint of a red R-base color and printing the dots 37b with a paint of a blue B-base color.

Figure 4:
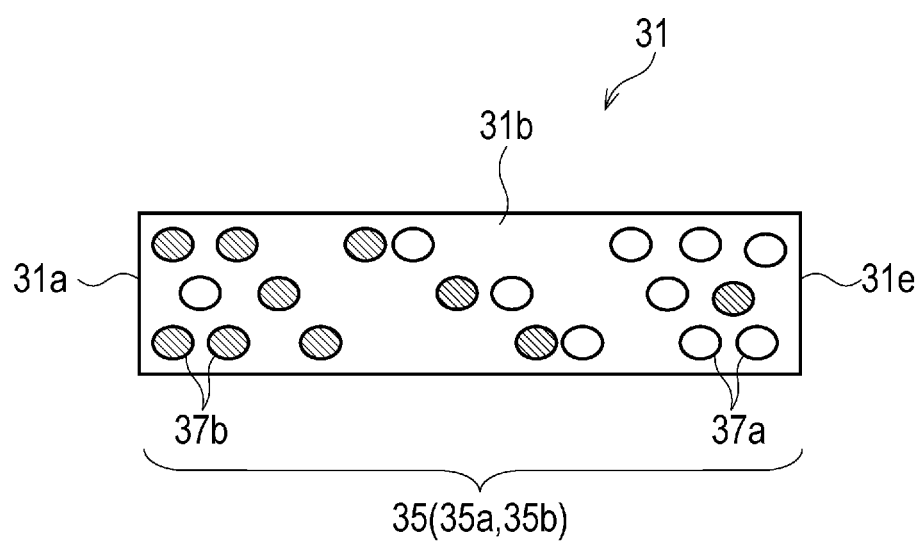
FIG. 4 is a schematic view of a reflection part 35 of this embodiment.

FIG. 4 is a schematic view of the reflection part 35 on the reflection surface 31b of the light guide 31 as seen from an arrow direction illustrated in FIG. 1. As illustrated in FIG. 4, the dots 37a, 37b constituting the first reflection part 35a and the second reflection part 35b are different in distribution density in the longitudinal direction of the light guide 31. Concretely, the dots 37a are formed such that the distribution density is lower on the first light entering surface 31a side and gradually increases toward the second light entering surface 31e. On the other hand, the dots 37b are formed such that the distribution density is lower on the second light entering surface 31e side and gradually increases toward the first light entering surface 31a.

In other words, the dots 37a, 37b are configured such that they are arranged at a low density at a portion close to the light entering surface and at a high density at a portion distant from the light entering surface depending on the distance from the light entering surface (the first light entering surface 31a, the second light entering surface 31e).

Figure 5:
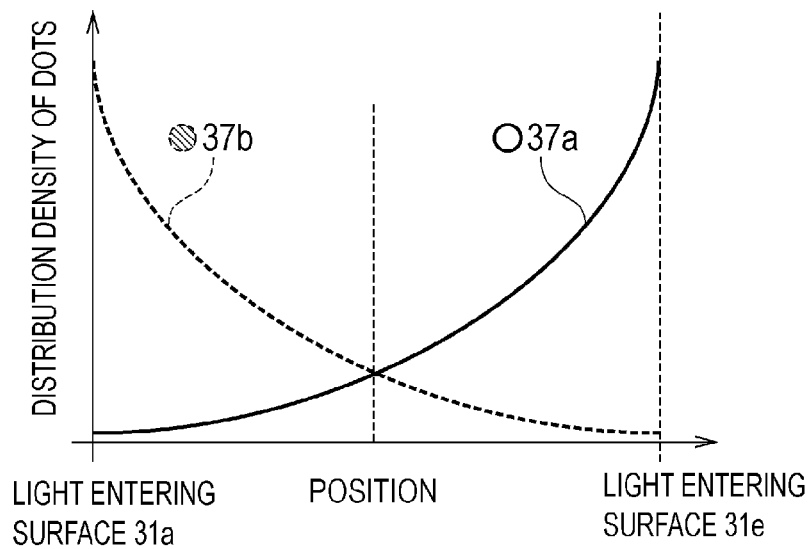
FIG. 5 is a graph indicating the distribution densities of the dots 37a, 37b of this embodiment.

FIG. 5 is a graph indicating the position in the longitudinal direction of the reflection surface 31b on the horizontal axis and the distribution densities of the dots 37a, 37b formed on the reflection surface 31b on the vertical axis. As illustrated in FIG. 5, the distribution densities vary such that the distribution density of the dots 37a increases toward the second light entering surface 31e and the distribution density of the dots 37b increases toward the first light entering surface 31a. Note that the distribution densities of the dots 37a, 37b are not always symmetrical about a middle in the longitudinal direction of the reflection surface 31b, but may differ depending on the reflectances of the dots 37a, 37b to the wavelengths.

By the light guide 31 configured as described above, the light ray from the light emitting element 34r arranged near the first light entering surface 31a is reflected and diffused by the dots 37a, and the light ray from the light emitting element 34b arranged near the second light entering surface 31e is reflected and diffused by the dots 37b. Further, the dots 37a, 37b are formed such that the distribution density increases as the dots 37a or 37b are more distant from the light emitting element emitting the light ray, to which the dots 37a or 37b have a higher reflectance, among the light emitting elements 34r, 34b. Concretely, the dots 37a having a higher reflectance to the light ray from the light emitting element 34r increase in distribution density as the dots 37a are more distant from the light emitting element 34r. Accordingly, the reflection surface 31b can reflect and diffuse, even at a position distant from the light emitting element 34r which the light ray from the light emitting element 34r hardly reaches, the light ray in an amount nearly equal to that at the position close to the light emitting element 34r, and therefore can make the light ray from the light emitting element 34r uniformly exit over the longitudinal direction of the light guide 31.

On the other hand, the dots 37b having a higher reflectance to the light ray from the light emitting element 34b increase in distribution density as the dots 37b are more distant from the light emitting element 34b. Accordingly, the reflection surface 31b can reflect and diffuse, even at a position distant from the light emitting element 34b which the light ray from the light emitting element 34b hardly reaches, the light ray in an amount nearly equal to that at the position close to the light emitting element 34b, and therefore can make the light ray from the light emitting element 34b uniformly exit over the longitudinal direction of the light guide 31.

The configuration in this embodiment is that a light emitting element is arranged near the first light entering surface 31a that is one of the light entering surfaces and a light emitting element having a different wavelength is arranged near the second light entering surface 31b that is the other of the light entering surfaces, and the dots 37a, 37b having reflectances corresponding to the respective emission wavelengths are formed on the reflection surface 31b.

Therefore, even when the light emitting elements 34r, 34b are arranged near the first light entering surface 31a and the second light entering surface 31e of the light guide 31 respectively, the distribution densities of the dots 37a, 37b different in spectral reflectance constituting the first reflection part 35a and the second reflection part 35b are varied, thereby making it possible to make the reflectances and the diffusibilities at portions close to the light emitting elements 34r, 34b low and gradually increase the reflectances and the diffusibilities toward far points. Therefore, even when the light emitting elements are increased in number, the light emitting elements can be arranged without increasing the size of the light guide 31, and the light rays exiting from the light guide 31 can be made uniform in illuminance.

Figure 6:
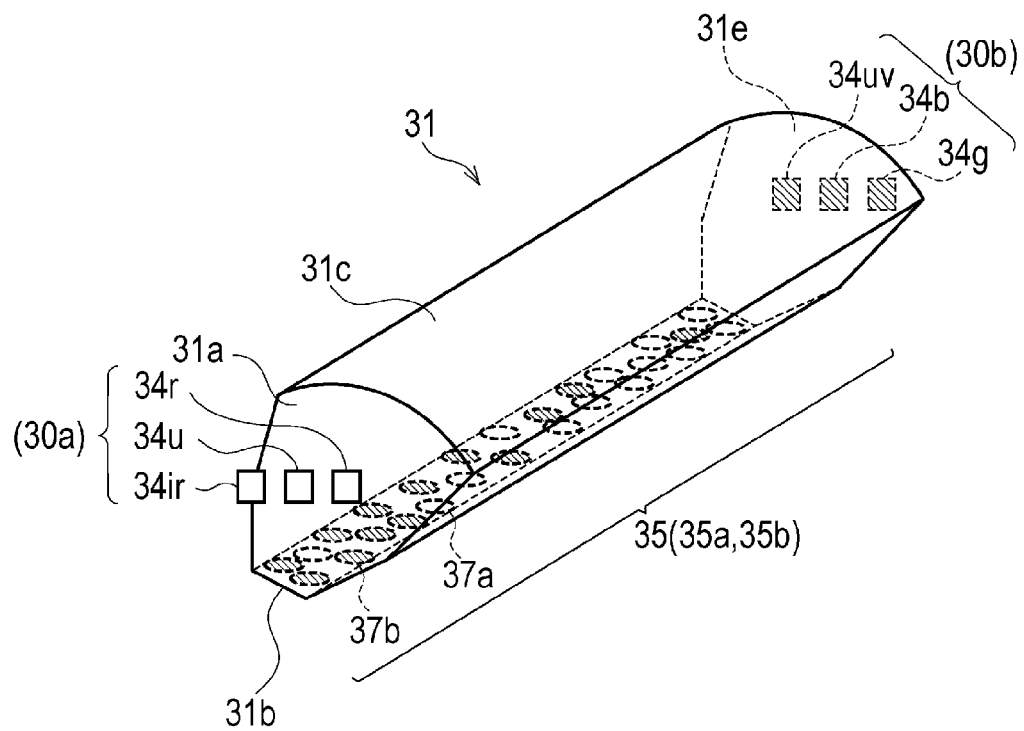
FIG. 6 is a view illustrating a state that a plurality of light emitting elements arranged near each of a first light entering surface 31a and a second light entering surface 31e of this embodiment.

Next, the case where a plurality of light emitting elements are arranged near each of the first light entering surface 31a and the second light entering surface 31e will be described referring to FIG. 6. FIG. 6 illustrates a configuration that light emitting elements 34u, 34ir as the first light source 30a are arranged near the first light entering surface 31a and light emitting elements 34g, 34uv as the second light source 30b are arranged near the second light entering surface 31e, in addition to the configuration illustrated in FIG. 1. The other configuration is the same as that in FIG. 1 and the description thereof is omitted.

The light emitting element 34uv illustrated in FIG. 6 emits a light ray with an ultraviolet UV emission wavelength, and the light emitting element 34ir emits a light ray with a near-infrared IR emission wavelength. The reason why the light emitting elements 34uv, 34ir are arranged is that when the original 2 is, for example, a bill or valuable stock certificate, the light ray with the ultraviolet UV emission wavelength and the light ray of the near-infrared IR emission wavelength illuminate the original 2 in order to read invisible ink printed on the original 2 for the purpose of security. Note that any one of the light emitting elements 34uv, 34ir may be arranged depending on the invisible ink.

Figure 7:
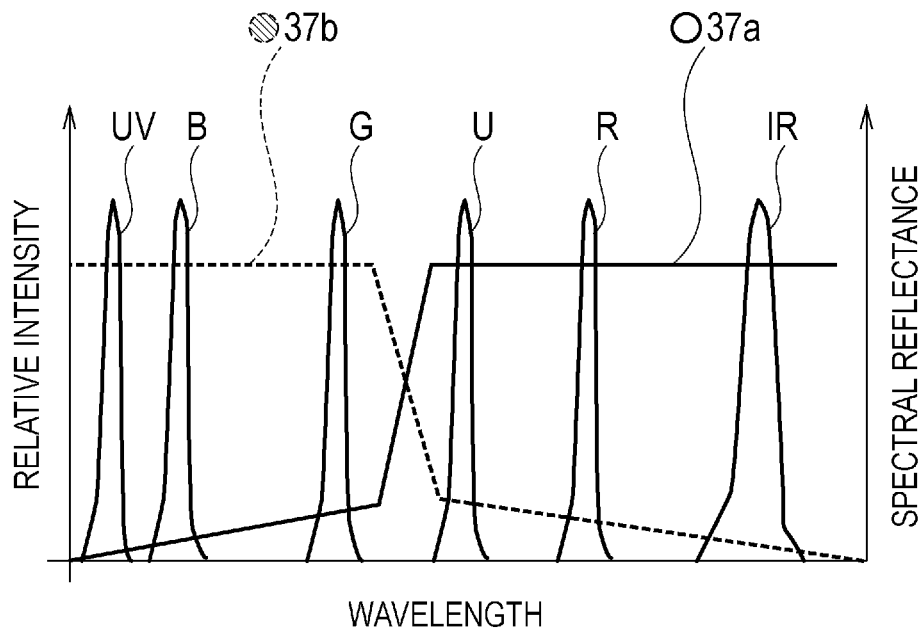
FIG. 7 is a graph indicating the relative relation among the wavelengths of light emitting elements 34*uv*, 34*b*, 34*g*, 34*u*, 34*r*, 34*ir*.

FIG. 7 is a graph indicating the relative relation among the emission wavelengths of the light emitting elements 34uv, 34b, 34g, 34u, 34r, 34ir. As illustrated in FIG. 7, the emission wavelengths increase in the order of the light emitting elements 34uv, 34b, 34g, 34u, 34r, 34ir. The light emitting elements 34u, 34r, 34ir arranged near the first light entering surface 31a emit light rays on the relatively long wavelength side as compared to the light emitting elements 34uv, 34b, 34g arranged near the second light entering surface 31e. On the other hand, the light emitting elements 34uv, 34b, 34g arranged near the second light entering surface 31e emit light rays on the relatively short wavelength side as compared to the light emitting elements 34u, 34r, 34ir arranged near the first light entering surface 31a.

FIG. 7 also illustrates spectral reflectance characteristics of the dots 37a, 37b formed on the reflection face 31b of the light guide 31. The dot 37a has a high reflectance to the light rays emitted from the light emitting elements 34u, 34r, 34ir classified to the long wavelength side. On the other hand, the dot 37b has a high reflectance to the light rays emitted from the light emitting elements 34uv, 34b, 34g classified to the short wavelength side. Accordingly, forming the dots 37a such that the distribution density increases as the dots 37a are more distant from the light emitting elements 34u, 34r, 34ir as illustrated in FIG. 5 enables the light rays from the light emitting elements 34u, 34r, 34ir to exit uniformly over the longitudinal direction of the light guide 31. Similarly, forming the dots 37b such that the distribution density increases as the dots 37b are more distant from the light emitting elements 34uv, 34b, 34g enables the light rays from the light emitting elements 34uv, 34b, 34g to exit uniformly over the longitudinal direction of the light guide 31.

The configuration in this embodiment is made such that the light emitting elements on the long wavelength side are arranged near the first light entering surface 31a that is one of the light entering surfaces and the light emitting elements on the short wavelength side are arranged near the second light entering surface 31e that is the other of the light entering surfaces, and the dots 37a, 37b having reflectances corresponding to regions of the respective emission wavelengths are formed on the reflection surface 31b.

Therefore, even when a plurality of light emitting elements are arranged near each of the first light entering surface 31a and the second light entering surface 31e of the light guide 31, the distribution densities of the dots 37a, 37b different in spectral reflectance constituting the first reflection part 35a and the second reflection part 35b are varied, thereby making it possible to make the reflectances and the diffusibilities at portions close to the light emitting elements 34u, 34r, 34ir and close to the light emitting elements 34uv, 34b, 34g low and gradually increase the reflectances and the diffusibilities toward far points. Therefore, even when the light emitting elements are increased in number, the plurality of light emitting elements can be arranged without increasing the size of the light guide 31, and the light rays exiting from the light guide 31 can be made uniform in illuminance.

In the foregoing, the present invention has been explained using the above-described embodiment, but the present invention is not limited only to the above-described embodiment. The present invention may be modified in the scope of the present invention.

For example, the light guide 31 in the case where two kinds of dots 37a, 37b different in spectral reflectance are formed has been described in the above-described embodiment, but is not limited to this case and may be configured such that two or more kinds of dots are formed.

Figure 8:
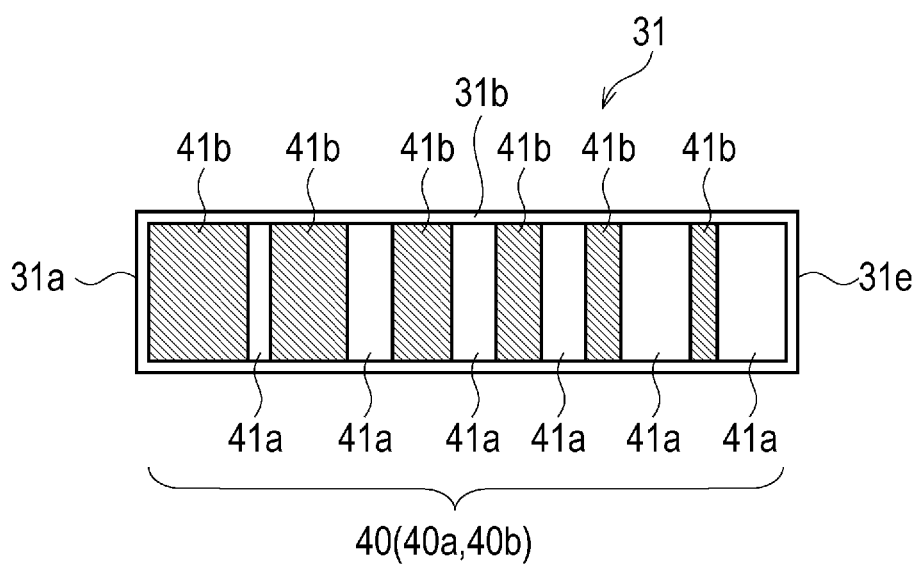
FIG. 8 is a schematic view of another reflection part 40 of this embodiment.

Further, the reflection part in the case where the dot pattern is formed has been described in the above-described embodiment, but is not limited to this case. FIG. 8 is a schematic view of another reflection part 40 on the reflection surface 31b of the light guide 31 as seen in the same direction as that of FIG. 4, in which rectangular parts 41a, 41b in a strobe shape in place of the dots are formed as the other reflection part 40. The rectangular parts 41a illustrated in FIG. 8 constitute a first reflection part 40a and have a high reflectance with respect to the emission wavelength of the light emitting element arranged near the first light entering surface 31a, and increase in area toward the second light entering surface 31e. On the other hand, the rectangular parts 41b illustrated in FIG. 8 constitute a second reflection part 40b and have a high reflectance with respect to the emission wavelength of the light emitting element arranged near the second light entering surface 31e, and increase in area toward the first light entering surface 31a.

As describe above, the shapes of the reflection parts are not limited and the areas of the reflection parts are varied to present the same effects as those in the above-described embodiment. Note that the areas of the rectangular parts 41a, 41b are not always symmetrical about a middle in the longitudinal direction of the reflection surface 31b, but may differ depending on the reflectances of the rectangular parts 41a, 41b to the emission wavelengths.

Further, the case of using the light emitting elements 34uv, 34b, 34g, 34u, 34r, 34ir has been described in the above-described embodiment, but the configuration is not limited to this case. Any unnecessary light emitting element may be omitted or another light emitting element corresponding to a color which is desired to be enhanced in color reproducibility may be added.

Further, the light source 30 (the first light source 30a and the second light source 30b) may have a light emitting element having the same emission wavelength added thereto or may be composed of a plurality of light emitting elements having the same wavelength.

Note that, for example, the light emitting elements having the same (or almost the same) emission wavelength added for increasing the light amount need to be arranged on any one of the first light source 30a and the second light source 30b. The reason why is as follows. In the case where the light emitting elements having the same (or almost the same) emission wavelength are arranged in both the first light source 30a and the second light source 30b, dot patterns composed of the same dots 37a, 37b having the same spectral reflectance are provided in the first reflection part 35a and the second reflection part 35b.

For this reason, when the light rays with the same emission wavelength (same color) are radiated from both the first light source 30a and the second light source 30b, the light rays from the light emitting elements are reflected and diffused by both the first reflection part 35a and the second reflection part 35b. This makes the illuminances of the light rays exiting from the light guide non-uniform.

Further, the dots 37a, 37b in the case where they are formed by silk-screen printing has been described in the above-described embodiment, but may be formed by another method such as direct application of the dots 37a, 37b.

Further, the light emitting elements 34u, 34r, 34ir emitting light rays with wavelengths equal to or longer than the emission wavelength of the light emitting element 34u are arranged near at the first light entering surface 31a and the light emitting elements 34g, 34b, 34uv emitting light rays with wavelengths equal to or shorter than the emission wavelength of the light emitting element 34g are arranged near the second light entering surface 31e in FIG. 6 and FIG. 7. In short, the light emitting elements are classified to the long wavelength side and the short wavelength side with the light emitting element 34u and the light emitting element 34g as a boundary, but the classification is not limited to this case. The light emitting elements may be classified at any position, for example, while setting the boundary at the light emitting element 34r and the light emitting element 34u or setting the boundary at the light emitting element 34g and the light emitting element 34b.

According to the present invention, it is possible to increase the number of light emitting elements emitting light rays with a desired emission wavelength without increasing the size of the light guide and to make uniform the illuminance of the light ray exiting from the light guide toward an illuminated object.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The present invention is effectively usable for an image sensor unit and an image reading apparatus and an image forming apparatus (for example, an image scanner, a facsimile, a copying machine, a multifunctional machine and the like) to which the image sensor unit is applied.

What is claimed is:

1. An image sensor unit, comprising:
a light guide reflecting light rays from a first light source and a second light source arranged near light entering surfaces at both ends thereof, by a reflection surface to make the light rays exit through a light exiting surface and illuminates an illuminated object;
an imaging element forming an image of a reflection light ray from the illuminated object; and
a sensor substrate on which a plurality of photoelectric conversion elements receiving the reflection light ray whose image is formed by said imaging element is mounted,
wherein said first light source is composed of one or a plurality of light emitting elements,
wherein said second light source is a light source different in emission wavelength from said first light source and composed of one or a plurality of light emitting elements,
wherein the reflection surface provided at a surface opposing the light exiting surface is provided with a first reflection part and a second reflection part,
wherein the first reflection part has a high spectral reflectance with respect to an emission wavelength from the light emitting element provided in said first light source, and has a reflectance on a side of the light entering surface arranged opposite to said first light source higher than a reflectance on a side of the light entering surface near which said first light source is arranged, and
wherein the second reflection part has a high spectral reflectance with respect to an emission wavelength from the light emitting element provided in said second light source, and has a reflectance on a side of the light entering surface arranged opposite to said second light source higher than a reflectance on a side of the light entering surface near which said second light source is arranged.

2. The image sensor unit according to claim 1,
wherein the light emitting elements are classified into a light emitting element on a relatively long wavelength side and a light emitting element on a relatively short wavelength side, and disposed in said first light source and said second light source.

3. The image sensor unit according to claim 2,
wherein when the light emitting element on the relatively long wavelength side is disposed in said first light source and the light emitting element on the relatively short wavelength side is disposed in said second light source, the first reflection part has a reflectance to an emission wavelength on the long wavelength side higher than a reflectance to an emission wavelength on the short wavelength side, and the second reflection part has a reflectance to the emission wavelength on the short wavelength side higher than a reflectance to the emission wavelength on the long wavelength side.

4. The image sensor unit according to claim 1,
wherein each of the first reflection part and the second reflection part is composed of a light diffusion pattern, and
wherein a distribution density of the light diffusion pattern varies according to a distance from each of the first reflection part and the second reflection part.

5. The image sensor unit according to claim 4,
wherein the light diffusion pattern is formed by applying a paint on the reflection surface.

6. An image reading apparatus, comprising:
an image sensor unit; and
an image reading section for reading a reflection light ray from an illuminated object while relatively moving said image sensor unit and the illuminated object,
wherein said image sensor unit comprises:
a light guide reflecting light rays from a first light source and a second light source arranged near light entering surfaces at both ends thereof, by a reflection surface to make the light rays exit through a light exiting surface and illuminates the illuminated object;
an imaging element forming an image of a reflection light ray from the illuminated object; and
a sensor substrate on which a plurality of photoelectric conversion elements receiving the reflection light ray whose image is formed by said imaging element is mounted,
wherein said first light source is composed of one or a plurality of light emitting elements,
wherein said second light source is a light source different in emission wavelength from said first light source and composed of one or a plurality of light emitting elements,
wherein the reflection surface provided at a surface opposing the light exiting surface is provided with a first reflection part and a second reflection part,
wherein the first reflection part has a high spectral reflectance with respect to an emission wavelength from the light emitting element provided in said first light source, and has a reflectance on a side of the light entering surface arranged opposite to said first light source higher than a reflectance on a side of the light entering surface near which said first light source is arranged, and
wherein the second reflection part has a high spectral reflectance with respect to an emission wavelength from the light emitting element provided in said second light source, and has a reflectance on a side of the light entering surface arranged opposite to said second light source higher than a reflectance on a side of the light entering surface near which said second light source is arranged.

7. An image forming apparatus, comprising:
an image sensor unit;
an image reading section for reading a reflection light ray from an illuminated object while relatively moving said image sensor unit and the illuminated object; and
an image forming section for forming an image on a recording medium,
wherein said image sensor unit comprises:
a light guide reflecting light rays from a first light source and a second light source arranged near light entering surfaces at both ends thereof, by a reflection surface to make the light rays exit through a light exiting surface and illuminates the illuminated object;
an imaging element forming an image of a reflection light ray from the illuminated object; and
a sensor substrate on which a plurality of photoelectric conversion elements receiving the reflection light ray whose image is formed by said imaging element is mounted,
wherein said first light source is composed of one or a plurality of light emitting elements, wherein said second light source is a light source different in emission wavelength from said first light source and composed of one or a plurality of light emitting elements, wherein the reflection surface provided at a surface opposing the light exiting surface is provided with a first reflection part and a second reflection part, wherein the first reflection part has a high spectral reflectance with respect to an emission wavelength from the light emitting element provided in said first light source, and has a reflectance on a side of the light entering surface arranged opposite to said first light source higher than a reflectance on a side of the light entering surface near which said first light source is arranged, and wherein the second reflection part has a high spectral reflectance with respect to an emission wavelength from the light emitting element provided in said second light source, and has a reflectance on a side of the light entering surface arranged opposite to said second light source higher than a reflectance on a side of the light entering surface near which said second light source is arranged.

* * * * *